US012632073B2

(12) United States Patent
Hu et al.

(10) Patent No.: US 12,632,073 B2
(45) Date of Patent: May 19, 2026

(54) REFERENCE VOLTAGE CIRCUIT AND METHOD FOR DESIGNING THE SAME

(71) Applicant: Chongqing GigaChip Technology Co., Ltd., Chongqing (CN)

(72) Inventors: Rongbin Hu, Chongqing (CN); Can Zhu, Chongqing (CN); Jianan Wang, Chongqing (CN); Guangbing Chen, Chongqing (CN); Dongbing Fu, Chongqing (CN); Zhengping Zhang, Chongqing (CN); Zhou Yu, Chongqing (CN); Zhimei Yang, Chongqing (CN); Min Gong, Chongqing (CN)

(73) Assignee: Chongqing GigaChip Technology Co., Ltd., Chongqing (CN)

( * ) Notice: Subject to any disclaimer, the term of this patent is extended or adjusted under 35 U.S.C. 154(b) by 267 days.

(21) Appl. No.: 18/603,155

(22) Filed: Mar. 12, 2024

(65) Prior Publication Data

US 2024/0219944 A1 Jul. 4, 2024

Related U.S. Application Data

(63) Continuation of application No. PCT/CN2021/140253, filed on Dec. 22, 2021.

(30) Foreign Application Priority Data

Nov. 1, 2021 (CN) ......................... 202111285077.4

(51) Int. Cl.
*G05F 3/30* (2006.01)
*G05F 1/46* (2006.01)
(Continued)

(52) U.S. Cl.
CPC .............. *G05F 1/567* (2013.01); *G05F 1/575* (2013.01); *G05F 1/468* (2013.01); *G05F 3/267* (2013.01); *G05F 3/30* (2013.01)

(58) Field of Classification Search
CPC ............. G05F 1/468; G05F 3/267; G05F 3/30
See application file for complete search history.

(56) References Cited

U.S. PATENT DOCUMENTS 6,107,868 A 8/2000 Diniz et al.
2008/0136504 A1* 6/2008 Kim .......................... G05F 3/30 327/539
(Continued)

FOREIGN PATENT DOCUMENTS

CN 103389769 A 11/2013
CN 110262622 A 9/2019
(Continued)

*Primary Examiner* — Gary A Nash

(57) ABSTRACT

Reference voltage circuits and methods for designing the same are provided. The reference voltage circuit includes: a reference core unit configured to output a reference voltage; a main amplification unit connected to the reference core unit and configured to form feedback to the reference core unit; and a feedforward amplification unit connected to the main amplification unit and configured to form feedforward to the main amplification unit. The reference core unit, the main amplification unit, and the feedforward amplification unit form a third-order negative feedback loop to improve a power supply rejection ratio of the reference voltage.

10 Claims, 3 Drawing Sheets

(51) Int. Cl.

| | |
|---|---|
| ***G05F 1/567*** | (2006.01) |
| ***G05F 1/575*** | (2006.01) |
| ***G05F 3/26*** | (2006.01) |

(56) References Cited

U.S. PATENT DOCUMENTS

| | | | | | |
|---|---|---|---|---|---|
| 2009/0001958 | A1* | 1/2009 | Fujii | G05F 3/30 | 323/313 |
| 2011/0101256 | A1* | 5/2011 | Shimizu | H03F 3/08 | 250/208.2 |
| 2012/0262227 | A1* | 10/2012 | Nagata | G05F 3/242 | 327/541 |
| 2014/0152348 | A1* | 6/2014 | Hu | H03K 3/01 | 327/108 |

FOREIGN PATENT DOCUMENTS

| | | | |
|---|---|---|---|
| CN | 111538364 | A | 8/2020 |
| WO | 2017049840 | A1 | 3/2017 |

* cited by examiner

Prior art FIG.1

REFERENCE VOLTAGE CIRCUIT AND METHOD FOR DESIGNING THE SAME

CROSS REFERENCE TO RELATED APPLICATION

The present disclosure is a continuation application of PCT Application Serial No. PCT/CN2021/140253, filed on Dec. 22, 2021, which claims the priority to a Chinese Application No. CN202111285077.4, filed on Nov. 1, 2021, the contents of all of which are incorporated herein by reference in their entirety for all purposes.

TECHNICAL FIELD

The present disclosure relates to the technical field of integrated circuits, and in particular to a reference voltage circuit and a method for designing the same.

BACKGROUND

A reference voltage circuit is a key component of high-precision integrated circuits such as A/D (analog to digital) converters. The accuracy of the reference voltage circuit directly affects the accuracy of the A/D converter. In addition to excellent temperature characteristics, the reference voltage circuit may also require high power supply resistance to be able to maintain high accuracy in an environment with large power supply voltage fluctuations.

SUMMARY

Embodiments of the present disclosure provide reference voltage circuits.

According to exemplary embodiments of the present disclosure, a reference voltage circuit includes: a reference core unit configured to output a reference voltage; a main amplification unit connected to the reference core unit and configured to form feedback to the reference core unit; and a feedforward amplification unit connected to the main amplification unit and configured to form feedforward to the main amplification unit. The reference core unit, the main amplification unit, and the feedforward amplification unit form a third-order negative feedback loop to improve the power supply rejection ratio of the reference voltage.

In some embodiments, the reference core unit includes a first nMOSFET (n-type metal-oxide-semiconductor field-effect transistor), a first resistor, a second resistor, a third resistor, a first NPN transistor, a second NPN transistor, a third NPN transistor, and the fourth NPN transistor. A drain of the first nMOSFET is connected to a power supply voltage, a source of the first nMOSFET is sequentially connected to the first resistor, the second resistor, and a collector of the first NPN transistor in series, the collector of the first NPN transistor is connected to a base of the first NPN transistor, an emitter of the first NPN transistor is connected to a collector of the second NPN transistor, the collector of the second NPN transistor is connected to a base of the second NPN transistor, an emitter of the second NPN transistor is connected to ground, the source of the first nMOSFET is connected in sequence to the third resistor and a collector of the third NPN transistor in series, the collector of the third NPN transistor is connected to a base of the third NPN transistor, an emitter of the third NPN transistor is connected to a collector of the fourth NPN transistor, a collector of the fourth NPN transistor is connected to a base of the fourth NPN transistor, an emitter of the fourth NPN transistor is connected to the emitter of the second NPN transistor, wherein the source of the first nMOSFET is configured to output the reference voltage.

In some embodiments, the ratio of an emitter junction area of the second NPN transistor to an emitter junction area of the fourth NPN transistor is n:1, and the ratio of an emitter junction area of the first NPN transistor to an emitter junction area of the third NPN transistor is n:1, where n is an integer greater than or equal to 1.

In some embodiments, the reference core unit further includes a first capacitor. One end of the first capacitor is connected to the source of the first nMOSFET, and the other end of the first capacitor is connected to the ground.

In some embodiments, the reference core unit further includes a fourth resistor, a fifth resistor, and a sixth resistor. The fourth resistor and the fifth resistor are connected in sequence in series between the emitter of the second NPN transistor and the ground. One end of the sixth resistor is connected to the source of the first nMOSFET, and the other end of the sixth resistor is connected to a common terminal between the fourth resistor and the fifth resistor.

In some embodiments, the sixth resistor includes an adjustable resistor.

In some embodiments, the main amplification unit includes a first PNP transistor, a second PNP transistor, a second nMOSFET, a third nMOSFET, a fifth NPN transistor, a sixth NPN transistor, and a first tail current source. An emitter of the first PNP transistor is connected to the power supply voltage, a base of the first PNP transistor is connected to a base of the second PNP transistor, a collector of the first PNP transistor is connected to a drain of the second nMOSFET, a gate of the second nMOSFET is connected to a bias voltage, a source of the second nMOSFET is connected to a collector of the fifth NPN transistor, a base of the fifth NPN transistor is connected to the collector of the third NPN transistor, a emitter of the fifth NPN transistor is connected to the first tail current source in series and then being grounded, an emitter of the second PNP transistor is connected to the power supply voltage, a collector of the second PNP transistor is connected to a gate of the first nMOSFET, the collector of the second PNP transistor is connected to a drain of the third nMOSFET, a gate of the third nMOSFET is connected to the bias voltage, a source of the third nMOSFET is connected to a collector of the sixth NPN transistor, a base of the sixth NPN transistor is connected to a common terminal between the first resistor and the second resistor, and an emitter of the sixth NPN transistor is connected to the emitter of the fifth NPN transistor.

In some embodiments, the feedforward amplification unit includes a first pMOSFET (p-type metal-oxide-semiconductor field-effect transistor), a second pMOSFET, a fourth nMOSFET, a fifth nMOSFET, and a second tail current source. A source of the first pMOSFET is connected to the power supply voltage, a gate of the first pMOSFET is connected to a gate of the second pMOSFET, a gate of the first pMOSFET is connected to a drain of the first pMOSFET, the drain of the first pMOSFET is connected to a drain of the fourth nMOSFET, a gate of the fourth nMOSFET is connected to the drain of the second nMOSFET, a source of the fourth nMOSFET is grounded after connecting to the second tail current in series, a source of the second pMOSFET is connected to the power supply voltage, a drain of the second pMOSFET is connected to a base of the first PNP transistor, the drain of the second pMOSFET is connected to a drain of the fifth nMOSFET, a gate of the fifth nMOSFET is connected to the drain of the third nMOSFET, and a source of the fifth nMOSFET is connected to the source of the fourth nMOSFET.

In some embodiments, the feedforward amplification unit further includes a second capacitor. One end of the second capacitor is connected to the gate of the fourth nMOSFET, and the other end of the second capacitor is connected to the drain of the fifth nMOSFET.

According to exemplary embodiments of the present disclosure, a method for designing a reference voltage circuit includes: on the basis of forming feedback to a reference core unit through a main amplification unit: using a feedforward amplification unit to form a feedforward to the main amplification unit; using the reference core unit, the main amplification unit, and the feedforward amplification unit to form a third-order negative feedback loop; and using the third-order negative feedback loop to improve a power supply rejection ratio of a reference voltage output by the reference core unit.

The reference voltage circuits and its design methods of some exemplary embodiments of the present disclosure may have the following beneficial effects.

On the basis of forming feedback to a reference core unit through a main amplification unit, by using a feedforward amplification unit to form feedforward to the main amplification unit and using the reference core unit, the main amplification unit, and the feedforward amplification unit to form a third-order negative feedback loop, compared with the second-order negative feedback loop formed by the main amplifier unit and the reference core unit, the gain of the third-order negative feedback loop is higher, which effectively improves the power supply rejection ratio of the reference voltage output by the reference core unit in the third-order negative feedback loop.

Figure 1:
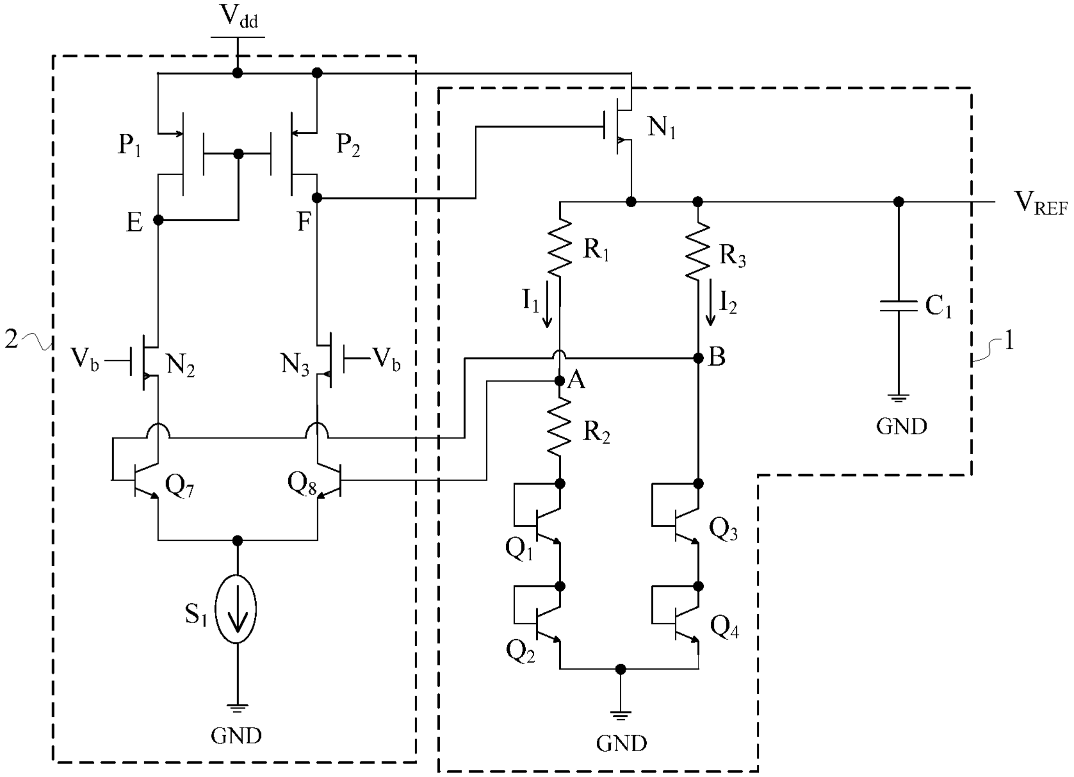
FIG. 1 is a circuit diagram of a reference voltage circuit in prior art.

EXPLANATION OF REFERENCE NUMBERS $C_1$—first capacitor, $C_2$—second capacitor, $I_1$—first current, $I_2$—second current, $N_1$—first nMOSFET, $N_2$—second nMOSFET, $N_3$—third nMOSFET, $N_4$—fourth nMOSFET, $N_5$—fifth nMOSFET, $P_1$—first pMOSFET, $P_2$—second pMOSFET, $Q_1$—first NPN transistor, $Q_2$—second NPN transistor, $Q_3$—third NPN transistor, $Q_4$—fourth NPN transistor, $Q_5$—first PNP transistor, $Q_6$—second PNP transistor, $Q_7$—fifth NPN transistor, $Q_8$—sixth NPN transistor, $R_1$—first resistor, $R_2$—second resistor, $R_3$—third resistor, $R_4$—fourth resistor, $R_5$—fifth resistor, $R_6$—sixth resistor, $S_1$—first tail current source, $S_2$—second tail current source, $V_{dd}$—power supply voltage, $V_{REF}$—reference voltage, GND—ground, A, B, D, E, F, H—nodes.

DESCRIPTION OF EMBODIMENTS

The embodiments of the present disclosure will be described below with reference to specific examples. Those skilled in the art can easily understand other advantages and effects of the present disclosure from the content disclosed in this specification. The present disclosure can also be implemented or applied through other different specific embodiments. Various details in this specification can also be modified or changed in various ways based on different viewpoints and applications without departing from the present disclosure.

Referring to FIG. 1 to FIG. 4, it should be noted that the diagrams provided in exemplary embodiments only illustrate the basic concept of the present disclosure in a schematic manner. The drawings only show the components related to the present disclosure and are not drawn according to the number of components, shapes, and scales. In actual implementation, the pattern, quantity, and scale of each component can be arbitrarily changed, and the layout and type of the component may be more complex. The structures, scales, sizes, etc. shown in the drawings attached to this specification are only used to coordinate with the content disclosed in the specification and are for the understanding and reading of those familiar with this technology. They are not used to limit the conditions for the implementation of the present disclosure, so they have no technical limitations. Any structural modifications, changes in scales, or adjustments in size without affecting the effects that the present disclosure can produce and the purposes that can be achieved, should still fall within the scope of the present disclosure covered by the technical content.

As for the reference voltage circuit shown in FIG. 1, it includes a reference core unit 1 and a main amplification unit 2, which is a basic bandgap reference structure. The inventors found through research that the reference voltage $V_{REF}$ generated by the reference voltage circuit is greatly affected by the fluctuation of the power supply voltage $V_{dd}$, and its power supply suppression capability is weak.

In exemplary embodiments, as shown in FIG. 1, the reference core unit 1 includes a first nMOSFET $N_1$, a first resistor $R_1$, a second resistor $R_2$, a third resistor $R_3$, a first NPN transistor $Q_1$, a second NPN transistor $Q_2$, a third NPN transistor $Q_3$, a fourth NPN transistor $Q_4$, and a first capacitor $C_1$. The drain of the first nMOSFET $N_1$ is connected to the power supply voltage $V_{dd}$. The source of the first nMOSFET $N_1$ is connected sequentially to the first resistor $R_1$, the second resistor $R_2$, and the collector of the first NPN transistor $Q_1$ in series. The collector of the first NPN transistor $Q_1$ is connected to the base of the first NPN transistor $Q_1$. The emitter of the first NPN transistor $Q_1$ is connected to the collector of the second NPN transistor $Q_2$. The collector of the second NPN transistor $Q_2$ is connected to the base of the second NPN transistor $Q_2$. The emitter of the second NPN transistor $Q_2$ is connected to the ground GND. The source of the first nMOSFET $N_1$ is connected sequentially to the third resistor $R_3$ and the collector of the third NPN transistor $Q_3$ in series. The collector of the third NPN transistor $Q_3$ is connected to the base of the third NPN transistor $Q_3$. The emitter of the third NPN transistor $Q_3$ is connected to the collector of the fourth NPN transistor $Q_4$. The collector of the fourth NPN transistor $Q_4$ is connected to the base of the fourth NPN transistor $Q_4$. The emitter of the fourth NPN transistor $Q_4$ is connected to the emitter of the second NPN transistor $Q_3$. The source of the first nMOSFET $N_1$ outputs the reference voltage $V_{REF}$. One end of the first capacitor $C_1$ is connected to the source of the first nMOSFET $N_1$, and the other end of the first capacitor $C_1$ is connected to the ground GND.

In addition, the ratio of the emitter junction area of the second NPN transistor $Q_2$ to the emitter junction area of the fourth NPN transistor $Q_4$ is n:1, and the ratio of the emitter junction area of the first NPN transistor $Q_1$ to the emitter junction area of the third NPN transistor $Q_3$ is also n:1, where n is an integer greater than or equal to 1.

In exemplary embodiments, as shown in FIG. 1, the main amplification unit 2 includes a first pMOSFET $P_1$, a second pMOSFET $P_2$, a second nMOSFET $N_2$, a third nMOSFET $N_3$, a fifth NPN transistor $Q_7$, a six NPN transistors $Q_8$, and a first tail current source $S_1$. The source of the first pMOSFET $P_1$ is connected to the power supply voltage $V_{dd}$. The gate of the first pMOSFET $P_1$ is connected to the gate of the second pMOSFET $P_2$. The gate of the first pMOSFET $P_1$ is also connected to the drain of the first pMOSFET $P_1$. The drain of the first pMOSFET $P_1$ is connected to the drain of the second nMOSFET $N_2$. The gate of the second nMOSFET $N_2$ is connected to a bias voltage $V_b$. The source of the second nMOSFET $N_2$ is connected to the collector of the fifth NPN transistor $Q_7$. The base of the fifth NPN transistor $Q_7$ is connected to the collector of the third NPN transistor $Q_3$. The emitter of the fifth NPN transistor $Q_7$ is connected sequentially to the first tail current source $S_1$ and the ground GND in series. The source of the second pMOSFET $P_2$ is connected to the power supply voltage $V_{dd}$. The drain of the second pMOSFET $P_2$ is connected to the gate of the first nMOSFET $N_1$. The drain of the second pMOSFET $P_2$ is also connected to the drain of the third nMOSFET $N_3$. The gate of the third nMOSFET $N_3$ is connected to the bias voltage $V_b$. The source of the third nMOSFET $N_3$ is connected to the collector of the sixth NPN transistor $Q_8$. The base of the sixth NPN transistor $Q_8$ is connected to the common terminal between the first resistor $R_1$ and the second resistor $R_2$. The emitter of the sixth NPN transistor $Q_8$ is connected to the emitter of the fifth NPN transistor $Q_7$.

In more detail, as shown in FIG. 1, under the action of the main amplification unit 2 based on the differential amplifier structure, the voltages of the differential input positive terminal and the differential input negative terminal of the main amplification unit 2 are substantially equal, that is, node A and node B in the reference core unit 1 have the same potential. Therefore, the following equation can be obtained:

$$V_{be2} + V_{be1} + I_1 R_2 = V_{be4} + V_{be3}, \tag{1}$$

where $V_{be1}$, $V_{be2}$, $V_{be3}$, and $V_{be4}$ are voltage drops of base-emitter junctions of the first NPN transistor $Q_1$, the second NPN transistor $Q_2$, the third NPN transistor $Q_3$, and the fourth NPN transistor $Q_4$, respectively, and $I_1$ is the current flowing through the second resistor $R_2$.

According to the inherent current-voltage relationship of the transistor and the equation (1), the following equation can be obtained:

$$\frac{kT}{q}\ln\frac{I_1}{I_{s2}} + \frac{KT}{q}\ln\frac{I_1}{I_{s1}} + I_1 R_2 = \frac{KT}{q}\ln\frac{I_2}{I_{s4}} + \frac{KT}{q}\ln\frac{I_2}{I_{s3}}, \tag{2}$$

where k is the Boltzmann constant, T is the absolute temperature, q is the electron charge, $I_{s1}$, $I_{s2}$, $I_{s3}$, and $I_{s4}$ are the reverse saturation currents of the first NPN transistor $Q_1$, the second NPN transistor $Q_2$, the third NPN transistor $Q_3$, and the fourth NPN transistor $Q_4$, respectively, and $I_2$ is the current flowing through the third resistor $R_3$.

By arranging equation (2), the following equation can be obtained:

$$I_1 = \frac{kT}{qR_2}\ln\frac{I_2^2 I_{s2} I_{s1}}{I_1^2 I_{s4} I_{s3}}. \tag{3}$$

According to the operating principle of the transistor, the reverse saturation current of a transistor is proportional to the emitter junction area of the transistor. Given that the ratio of the emitter junction area of the second NPN transistor $Q_2$ to the emitter junction area of the fourth NPN transistor $Q_4$ is n:1, and the ratio of the emitter junction area of the first NPN transistor $Q_1$ to the emitter junction area of the third NPN transistor $Q_3$ is also n:1, the following equation can be obtained:

$$I_1 = \frac{2kT}{qR_2}\ln\frac{nI_2}{I_1}. \tag{4}$$

Since $I_1R_1=I_2R_3$, the following equation can be obtained:

$$I_1 = \frac{2kT}{qR_2}\ln\frac{nR_1}{R_3}. \tag{5}$$

Since $V_{REF}=V_{be2}+V_{be1}+I_1(R_1+R_2)$, the following equation can be obtained:

$$V_{REF} = 2V_{be1} + \frac{2kT(R_1+R_2)}{qR_2}\ln\frac{nR_1}{R_3}. \tag{6}$$

Assuming that $V_{be1}$ is equal to $V_{be2}$, that is, the parameter specifications of the first NPN transistor $Q_1$ and the second NPN transistor $Q_2$ are the same, the first term on the right side of equation (6) is a negative temperature coefficient, and the second term is a positive temperature coefficient. The value of the temperature coefficient of the second term on the right side of equation (6) can be modulated by adjusting the specific resistance values of the first resistor $R_1$, the second resistor $R_2$, and the third resistor $R_3$, thereby achieving the compensation and cancellation between the negative temperature coefficient of the first term and the positive temperature coefficient of the second term, so as to obtain a reference voltage $V_{REF}$ that almost does not change with temperature.

However, as shown in FIG. 1, the potential of node E increases as the power supply voltage $V_{dd}$ increases, but the electrical level of node F remains approximately unchanged. According to the principle of the main amplification unit 2, the potential of node E increases by $\Delta V$ relative to the potential of node F, which will cause the potential of node A to increase by $\Delta V/G_{A1}$ relative to the potential of node B, where $G_{A1}$ is the gain of the main amplification unit 2. The increase in the potential of node A relative to the potential of node B will eventually cause the output reference voltage $V_{REF}$ to increase by approximately $(R_1+R_2)*\Delta V/(R_2*G_{A1})$. In the case that the gain $G_{A1}$ of the main amplification unit 2 is limited, the reference voltage $V_{REF}$ generated by the reference voltage circuit shown in FIG. 1 will be very susceptible to fluctuations in the power supply voltage $V_{dd}$.

Based on this, the present disclosure proposes a method for designing a reference voltage circuit. For example, on the basis that feedback to a reference core unit is formed by a main amplification unit, a feedforward to the main amplification unit is formed by a feedforward amplification unit, a third-order negative feedback loop is formed by the reference core unit, the main amplification unit, and the feedforward amplification unit, and the power supply rejection ratio of the reference voltage output by the reference core unit is improved through the high gain of the third-order negative feedback loop.

Figure 2:
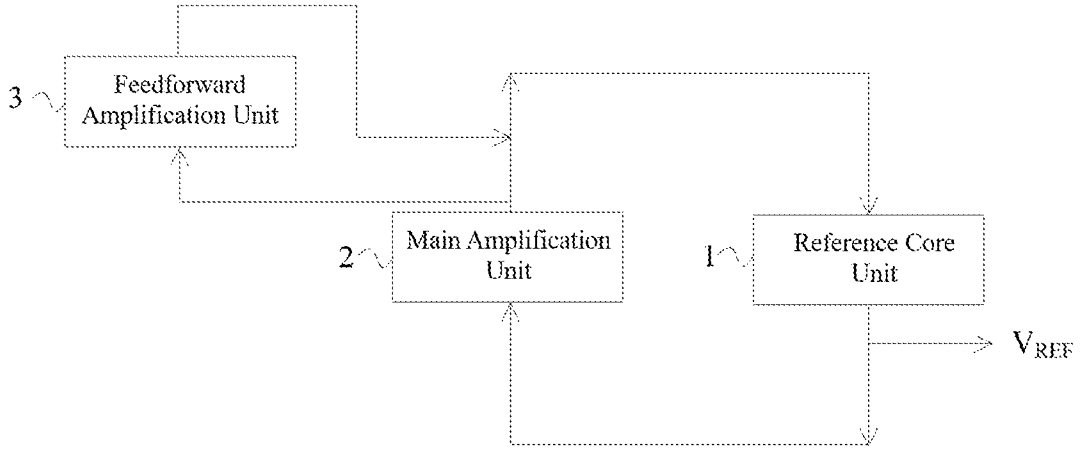
FIG. 2 is a structural block diagram of a reference voltage circuit according to exemplary embodiments of the present disclosure.

Correspondingly, as shown in FIG. 2, the present disclosure also proposes a reference voltage circuit, which includes: a reference core unit 1 configured to output a reference voltage $V_{REF}$; a main amplification unit 2 connected to the reference core unit 1 and configured to form feedback to the reference core unit 1; and a feedforward amplification unit 3 connected to the main amplification unit 2 and configured to form feedforward to the main amplification unit 2, where the reference core unit 1, the main amplification unit 2, and the feedforward amplification unit 3 form a third-order negative feedback loop to improve the power supply rejection ratio of the reference voltage $V_{REF}$.

Figure 3:
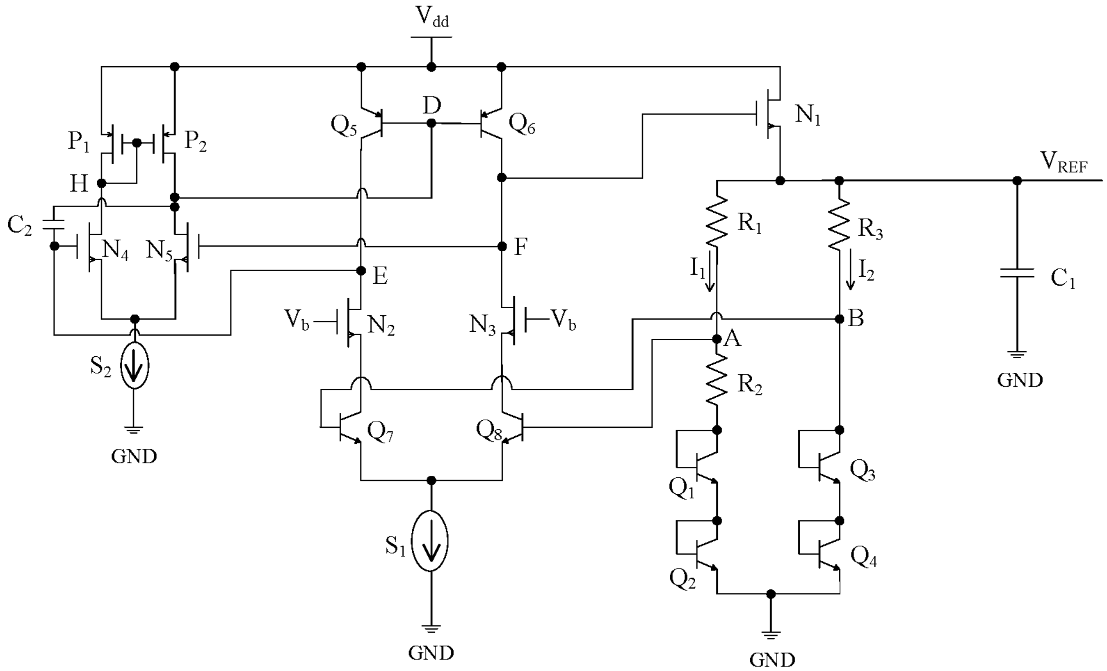
FIG. 3 is a circuit diagram of a reference voltage circuit according to exemplary embodiments of the present disclosure.

In exemplary embodiments of the present disclosure, as shown in FIG. 3, modification can be made based on the reference voltage circuit shown in FIG. 1. For example, a feedforward amplification unit 3 is added to an output end of the main amplification unit 2 to expand the loop to be a third-order loop.

In exemplary embodiments, as shown in FIG. 3, similar to FIG. 1, the reference core unit 1 includes a first nMOSFET $N_1$, a first resistor $R_1$, a second resistor $R_2$, a third resistor $R_3$, a first NPN transistor $Q_1$, a second NPN transistor $Q_2$, a third NPN transistor $Q_3$, and a fourth NPN transistor $Q_4$. The drain of the first nMOSFET $N_1$ is connected to the power supply voltage $V_{dd}$. The source of the first nMOSFET $N_1$ is connected to the first resistor $R_1$, the second resistor $R_2$, and the collector of the first NPN transistor $Q_1$ in series. The collector of the first NPN transistor $Q_1$ is connected to the base of the first NPN transistor $Q_1$. The emitter of the first NPN transistor $Q_1$ is connected to the collector of the second NPN transistor $Q_2$. The collector of the second NPN transistor $Q_2$ is connected to the base of the second NPN transistor $Q_2$. The emitter of the second NPN transistor $Q_2$ is connected to the ground GND. The source of the first nMOSFET $N_1$ is also connected sequentially to the third resistor $R_3$ and the collector of the third NPN transistor $Q_3$ in series. The collector of the third NPN transistor $Q_3$ is connected to the base of the third NPN transistor $Q_3$. The emitter of the third NPN transistor $Q_3$ is connected to the collector of the fourth NPN transistor $Q_4$. The collector of the fourth NPN transistor $Q_4$ is connected to the base of the fourth NPN transistor $Q_4$. The emitter of the fourth NPN transistor $Q_4$ is connected to the emitter of the second NPN transistor $Q_3$, where the source of the first nMOSFET $N_1$ outputs the reference voltage $V_{REF}$.

In addition, the ratio of the emitter junction area of the second NPN transistor $Q_2$ to the emitter junction area of the fourth NPN transistor $Q_4$ is n:1, and the ratio of the emitter junction area of the first NPN transistor $Q_1$ to the emitter junction area of the third NPN transistor $Q_3$ is also n:1, where n is an integer greater than or equal to 1.

In exemplary embodiments of the present disclosure, as shown in FIG. 3, the reference core unit 1 also includes a first capacitor $C_1$, where one end of the first capacitor $C_1$ is connected to the source of the first nMOSFET $N_1$, and the other end of the first capacitor $C_1$ is connected to ground GND. The gain of the third-order negative feedback loop that includes the reference core unit 1, the main amplification unit 2, and the feedforward amplification unit 3 is very large. This third-order negative feedback loop is very easy to oscillate. Therefore, a larger first capacitor $C_1$ is used to stabilize the entire loop. Generally, the capacitance of the first capacitor $C_1$ is on the order of microfarads.

In exemplary embodiments, as shown in FIG. 3, similar to FIG. 1, the main amplification unit 2 includes a first PNP transistor $Q_5$, a second PNP transistor $Q_6$, a second nMOSFET $N_2$, a third nMOSFET $N_3$, a fifth NPN transistor $Q_7$, a sixth NPN transistor $Q_8$, and a first tail current source $S_1$. The emitter of the first PNP transistor $Q_5$ is connected to the power supply voltage $V_{dd}$. The base of the first PNP transistor $Q_5$ is connected to the base of the second PNP transistor $Q_6$. The collector of the first PNP transistor $Q_5$ is connected to the drain of the second nMOSFET $N_2$. The gate of the second nMOSFET $N_2$ is connected to the bias voltage $V_b$. The source of the second nMOSFET $N_2$ is connected to the collector of the fifth NPN transistor $Q_7$. The base of the fifth NPN transistor $Q_7$ is connected to the collector of the third NPN transistor $Q_3$. The emitter of the fifth NPN transistor $Q_7$ is connected sequentially to the first tail current source $S_1$ and ground in series. The emitter of the second PNP transistor $Q_6$ is connected to the power supply voltage $V_{dd}$. The collector of the second PNP transistor $Q_6$ is connected to the gate of the first nMOSFET $N_1$. The collector of the second PNP transistor $Q_6$ is also connected to the drain of the third nMOSFET $N_3$. The gate of the third nMOSFET $N_3$ is connected to the bias voltage $V_b$. The source of the third nMOSFET $N_3$ is connected to the collector of the sixth NPN transistor $Q_8$. The base of the sixth NPN transistor $Q_8$ is connected to the common terminal between the first resistor $R_1$ and the second resistor $R_2$. The emitter of the sixth NPN transistor $Q_8$ is connected to the emitter of the fifth NPN transistor $Q_7$.

In exemplary embodiments, as shown in FIG. 3, the feedforward amplification unit 3 includes a first pMOSFET $P_1$, a second pMOSFET $P_2$, a fourth nMOSFET $N_4$, a fifth nMOSFET $N_5$, and a second tail current source $S_2$. The source of the first pMOSFET $P_1$ is connected to the power supply voltage $V_{dd}$. The gate of the first pMOSFET $P_1$ is connected to the gate of the second pMOSFET $P_2$. The gate of the first pMOSFET $P_1$ is also connected to the drain of the first pMOSFET $P_1$. The drain of the first pMOSFET $P_1$ is connected to the drain of the fourth nMOSFET $N_4$. The gate of the fourth nMOSFET $N_4$ is connected to the drain of the second nMOSFET $N_2$. The source of the fourth nMOSFET $N_4$ is connected sequentially to the second tail current source $S_2$ and the ground in series. The source of the second pMOSFET $P_2$ is connected to the power supply voltage $V_{dd}$. The drain of the second pMOSFET $P_2$ is connected to the base of the first PNP transistor $Q_5$. The drain of the second pMOSFET $P_2$ is also connected to the drain of the fifth nMOSFET $N_5$. The gate of the fifth nMOSFET $N_5$ is connected to the drain of the third nMOSFET $N_3$. The source of the fifth nMOSFET $N_5$ is connected to the source of the fourth nMOSFET $N_4$.

In exemplary embodiments, as shown in FIG. 3, the feedforward amplification unit 3 also includes a second capacitor $C_2$. For example, one end of the second capacitor $C_2$ is connected to the gate of the fourth nMOSFET $N_4$, and the other end of the second capacitor $C_2$ is connected to the drain of five nMOSFETs $N_5$.

In exemplary embodiments, for the reference voltage circuit shown in FIG. 3, it is assumed that the potentials of node A and node B are the same at the beginning. If the reference voltage $V_{REF}$ increases by $\Delta V$, the potential of node A will be higher than the potential of node B by approximately $\Delta V*R_2/(R_1+R_2)$. Let $G_{A1}$ represent the gain of the main amplifying unit 2. Through the action of the main amplifying unit 2, the potential of node F will be lower than the potential of node E $G_{A1}*\Delta V*R_2/(R_1+R_2)$. $G_{A2}$ represents the gain of the feedforward amplifier unit 3. Through the action of the feedforward amplifier unit 3, the potential of node D will increase by $G_{A2}*G_{A1}*\Delta V*R_2/(R_1+R_2)$. The increase in the potential of node D will cause the potential of node F to decrease by $G_{D2F}*G_{A2}*G_{A1}*\Delta V*R_2/(R_1+R_2)$, where $G_{D2F}$ represents the gain from node D to node F. Therefore, through the action of the main amplification unit 2 and the feedforward amplification unit 3, the potential of the node F decreases by a total of $G_{A1}*\Delta V*R_2/(R_1+R_2)+G_{D2F}*G_{A2}*G_{A1}*\Delta V*R_2/(R_1+R_2)=(G_{A1}+G_{D2F}*G_{A2}*G_{A1})*\Delta V*R_2/(R_1+R_2)$. Through the action of node F to the reference voltage $V_{REF}$, the reference voltage $V_{REF}$ will decrease by $(G_{A1}+G_{D2F}*G_{A2}*G_{A1})*\Delta V*R_2/(R_1+R_2)$. Therefore, from the reference voltage $V_{REF}$ to node A, from node A to node F, and from node F back to the reference voltage $V_{REF}$, a third-order negative feedback loop is formed. The gain $G_{loop}$ of the loop is as follows:

$$G_{loop}=(G_{A1}+G_{D2F}*G_{A2}*G_{A1})*R_2/(R_1+R_2)\approx G_{D2F}*G_{A2}*G_{A1}*R_2/(R_1+R_2), \tag{7}$$

It can be known from the knowledge of integrated circuits that $G_{D2F}$, $G_{A2}$, and $G_{A1}$ are all values of tens or hundreds. Therefore, the gain $G_{loop}$ of the third-order negative feedback loop can reach a value of tens of thousands. Therefore, a larger loop gain can make the reference voltage $V_{REF}$ quickly self-correct. When the reference voltage $V_{REF}$ changes to a high or low level, it can be quickly corrected through the third-order negative feedback loop without fluctuating with the fluctuation of the power supply voltage $V_{dd}$. The reference voltage $V_{REF}$ has an extremely high power supply rejection ratio.

At the same time, such a large loop gain makes the feedback loop (i.e., $V_{REF}\rightarrow A\rightarrow F\rightarrow V_{REF}$) very easy to oscillate, so a larger second capacitor $C_2$ is used to stabilize the entire loop.

Similar to the analysis in FIG. 1, $V_{REF}$ in FIG. 3 can be analyzed as follows. Due to the role of the feedback loop (i.e., $V_{REF}\rightarrow A\rightarrow F\rightarrow V_{REF}$), plus its loop gain $G_{loop}$ is on the order of magnitude of tens of thousands. Therefore, the potentials of node A and node B are approximately equal. Ignoring the influence of the current flowing through the base of the fifth NPN transistor $Q_7$ and the sixth NPN transistor $Q_8$, there is:

$$V_{be2}+V_{be1}+I_1R_2=V_{be4}+V_{be3}, \tag{8}$$

where $V_{be1}$, $V_{be2}$, $V_{be3}$, and $V_{be4}$ are voltage drops of the base-emitter junctions of the first NPN transistor $Q_1$, the second NPN transistor $Q_2$, the third NPN transistor $Q_3$, and the fourth NPN transistor $Q_4$, respectively, and $I_1$ is the current flowing through the second resistor $R_2$.

According to the inherent current-voltage relationship of the transistor and equation (1), there is:

$$\frac{kT}{q}\ln\frac{I_1}{I_{s2}}+\frac{KT}{q}\ln\frac{I_1}{I_{s1}}+I_1R_2=\frac{KT}{q}\ln\frac{I_2}{I_{s4}}+\frac{KT}{q}\ln\frac{I_2}{I_{s3}}, \tag{9}$$

where k is a Boltzmann constant, T is the absolute temperature, q is the electron charge, $I_{s1}$, $I_{s2}$, $I_{s3}$, and $I_{s4}$ are reverse saturation current of the first NPN transistor $Q_1$, the second NPN transistor $Q_2$, the third NPN transistor $Q_3$, and the fourth NPN transistor $Q_4$, respectively. $I_2$ is the current flowing through the third resistor $R_3$.

By arranging equation (9), the following equation can be obtained:

$$I_1=\frac{kT}{qR_2}\ln\frac{I_2^2I_{s2}I_{s1}}{I_1^2I_{s4}I_{s3}}. \tag{10}$$

According to the working principle of the transistor, the reverse saturation current of a transistor is proportional to the emitter junction area of the transistor. Since the ratio of the emitter junction area of the second NPN transistor $Q_2$ to the emitter junction area of the fourth NPN transistor $Q_4$ is n:1, and the ratio of the emitter junction area of the first NPN transistor $Q_1$ to the emitter junction area of the third NPN transistor $Q_3$ is also n:1, the following equation can be obtained:

$$I_1=\frac{2kT}{qR_2}\ln\frac{nI_2}{I_1}. \tag{11}$$

Since $I_1R_1=I_2R_3$, the following equation can be obtained:

$$I_1=\frac{2kT}{qR_2}\ln\frac{nR_1}{R_3}. \tag{12}$$

Since $V_{REF}=V_{be2}+V_{be1}+I_1(R_1+R_2)$, the following equation can be obtained:

$$V_{REF}=2V_{be1}+\frac{2kT(R_1+R_2)}{qR_2}\ln\frac{nR_1}{R_3}. \tag{13}$$

Like equation (6), the first term on the right side of equation (13) is a negative temperature coefficient, and the second term is a positive temperature coefficient. The value of the temperature coefficient of the second term on the right side of equation (13) can be modulated by adjusting the specific resistance values of the first resistor $R_1$, the second resistor $R_2$, and the third resistor $R_3$, thereby achieving the compensation and cancellation between the negative temperature coefficient of the first term and the positive temperature coefficient of the second term, so as to obtain a reference voltage $V_{REF}$ that almost does not change with temperature.

At the same time, in FIG. 3, it also forms a feedback loop (i.e., from node E to node D to node E), which will also cause oscillation. Therefore, a second capacitor $C_2$ (Miller Capacitor) is introduced to stabilize the loop.

In exemplary embodiments, in FIG. 3, if the power supply voltage $V_{dd}$ increases, the potential of node H will increase. What is different from the circuit of FIG. 1 is that the potential of node D will also increase as the power supply voltage $V_{dd}$ increases. Therefore, the potential difference between node H and node D is less affected by the power supply voltage $V_{dd}$. According to the principle of the feedforward amplification unit 3, compared with the potential difference between node H and node D, the influence of the power supply voltage $V_{dd}$ on the potential difference between node E and node F is reduced by $G_{A2}$ times. According to the principle of the main amplification unit 2, compared with the potential difference between node E and node F, the influence of the power supply voltage $V_{dd}$ on the potential difference between node A and node B is reduced by $G_{A1}$ times. In this way, under the action of the entire third-order negative feedback loop, the reference voltage $V_{REF}$ is very weakly affected by the power supply voltage $V_{dd}$, showing good power supply resistance.

Figure 4:
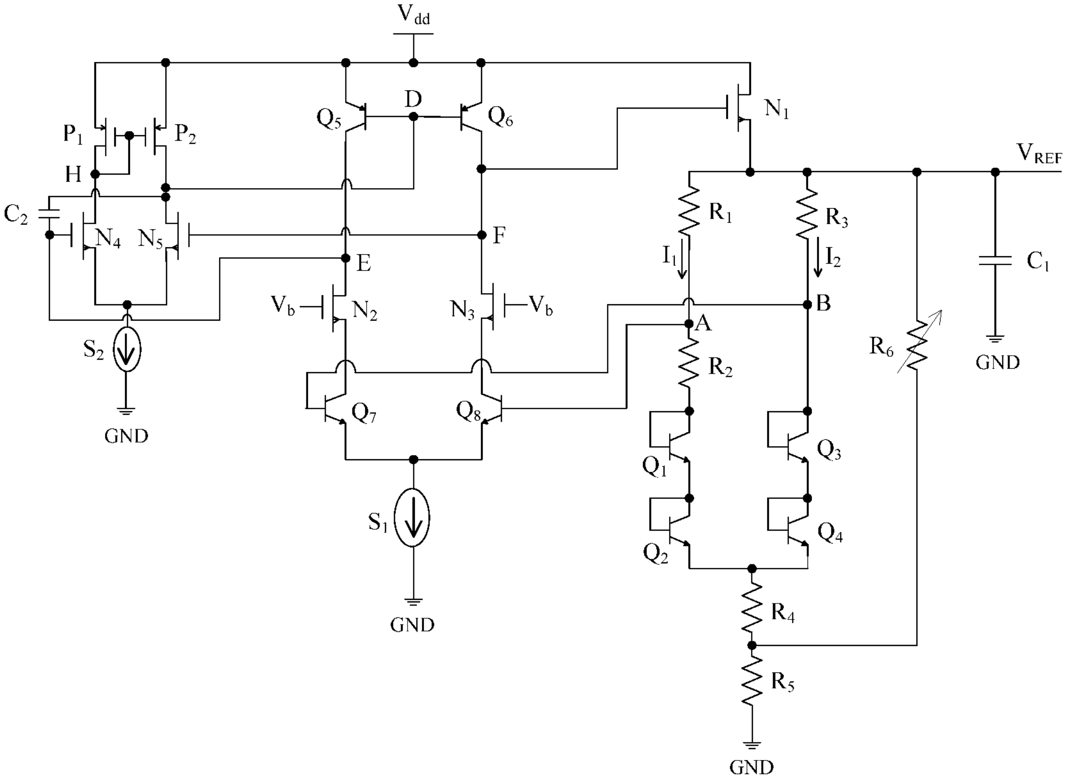
FIG. 4 is another circuit diagram of a reference voltage circuit according to exemplary embodiments of the present disclosure.

In exemplary embodiments of the present disclosure, as shown in FIG. 4, in order to obtain an accurate reference voltage $V_{REF}$ (e.g., 2.5V), the reference core unit 1 includes a fourth resistor $R_4$, a fifth resistor $R_5$, and the sixth resistor $R_6$. The fourth resistor $R_4$ and the fifth resistor $R_5$ are connected in series between the emitter of the second NPN transistor $Q_2$ and the ground GND. One end of the sixth resistor $R_6$ is connected to the source of the first nMOSFET $N_1$, and the other end of the sixth resistor $R_6$ is connected to the common end of the fourth resistor $R_4$ and the fifth resistor $R_5$. The sixth resistor $R_6$ includes an adjustable resistor. The sixth resistor $R_6$ can be adjusted through analog or digital methods. As shown in FIG. 4, by adjusting the resistance of the sixth resistor $R_6$ through resistor-based voltage division adjustment, an accurate reference voltage $V_{REF}$ (e.g., 2.5V) can be output.

In summary, in the reference voltage circuit and its design method provided by the present disclosure, on the basis that feedback to a reference core unit is formed by a main amplification unit, by forming feedforward to the main amplification unit using a feedforward amplification unit and forming a third-order negative feedback loop using the reference core unit, the main amplification unit, and the feedforward amplification unit, compared with the second-order negative feedback loop formed by the main amplification unit and the reference core unit, the gain of the third-order negative feedback loop is higher, and the reference voltage can be quickly corrected through the third-order negative feedback loop when changes, such as being too high or too low, or the like, occur to the reference voltage, and will not fluctuate due to fluctuations in the power supply voltage. The reference voltage has an extremely high power supply rejection ratio. In other words, based on the attenuation and buffer against the fluctuations of the power supply voltage due to two larger gains of the main amplification unit and the feedforward amplification unit in the third-order negative feedback loop, the reference voltage is very weakly affected by the fluctuations of the power supply voltage, showing good power supply resistance. At the same time, based on the innovation of the third-order negative feedback loop structure, compared with the current technology, the voltage difference between the two input terminals of the main amplifier unit can remain relatively stable when the power supply voltage changes, thus keeping the reference voltage relatively stable.

The above embodiments only illustrate the principles and effects of the present disclosure and are not intended to limit the present disclosure. Anyone familiar with this technology can modify or change the above embodiments without departing from the scope of the present disclosure. Therefore, all equivalent modifications or changes made by those with ordinary knowledge in the technical field without departing from the present disclosure shall still fall within the scope of the claims of the present disclosure.

What is claimed is:

1. A reference voltage circuit, comprising:

a reference core unit configured to output a reference voltage;

a main amplification unit connected to the reference core unit and configured to form feedback to the reference core unit; and a feedforward amplification unit connected to the main amplification unit and configured to form feedforward to the main amplification unit, wherein the reference core unit, the main amplification unit, and the feedforward amplification unit form a third-order negative feedback loop to improve a power supply rejection ratio of the reference voltage.

2. The reference voltage circuit according to claim 1, wherein the reference core unit includes a first nMOSFET, a first resistor, a second resistor, a third resistor, a first NPN transistor, a second NPN transistor, a third NPN transistor, and a fourth NPN transistor; and a drain of the first nMOSFET is connected to a power supply voltage, a source of the first nMOSFET is sequentially connected to the first resistor, the second resistor, and a collector of the first NPN transistor in series, the collector of the first NPN transistor is connected to a base of the first NPN transistor, an emitter of the first NPN transistor is connected to a collector of the second NPN transistor, the collector of the second NPN transistor is connected to a base of the second NPN transistor, an emitter of the second NPN transistor is connected to ground, the source of the first nMOSFET is connected sequentially to the third resistor and a collector of the third NPN transistor in series, the collector of the third NPN transistor is connected to a base of the third NPN transistor, an emitter of the third NPN transistor is connected to a collector of the fourth NPN transistor, a collector of the fourth NPN transistor is connected to a base of the fourth NPN transistor, an emitter of the fourth NPN transistor is connected to the emitter of the second NPN transistor, wherein the source of the first nMOSFET is configured to output the reference voltage.

3. The reference voltage circuit according to claim 2, wherein a ratio of an emitter junction area of the second NPN transistor to an emitter junction area of the fourth NPN transistor is n:1, and a ratio of an emitter junction area of the first NPN transistor to an emitter junction area of the third NPN transistor is n:1, where n is an integer greater than or equal to 1.

4. The reference voltage circuit according to claim 2, wherein the reference core unit further includes a first capacitor; and a first end of the first capacitor is connected to the source of the first nMOSFET, and a second end of the first capacitor is connected to the ground.

5. The reference voltage circuit according to claim 2, wherein the reference core unit further includes a fourth resistor, a fifth resistor, and a sixth resistor;

the fourth resistor and the fifth resistor are connected sequentially in series between the emitter of the second NPN transistor and the ground; and a first end of the sixth resistor is connected to the source of the first nMOSFET, and a second end of the sixth resistor is connected to a common terminal between the fourth resistor and the fifth resistor.

6. The reference voltage circuit according to claim 5, wherein the sixth resistor includes an adjustable resistor.

7. The reference voltage circuit according to claim 2, wherein the main amplification unit includes a first PNP transistor, a second PNP transistor, a second nMOSFET, a third nMOSFET, a fifth NPN transistor, a sixth NPN transistor, and a first tail current source; and an emitter of the first PNP transistor is connected to the power supply voltage, a base of the first PNP transistor is connected to a base of the second PNP transistor, a collector of the first PNP transistor is connected to a drain of the second nMOSFET, a gate of the second nMOSFET is connected to a bias voltage, a source of the second nMOSFET is connected to a collector of the fifth NPN transistor, a base of the fifth NPN transistor is connected to the collector of the third NPN transistor, a emitter of the fifth NPN transistor is grounded after connecting to the first tail current source in series, an emitter of the second PNP transistor is connected to the power supply voltage, a collector of the second PNP transistor is connected to a gate of the first nMOSFET, the collector of the second PNP transistor is connected to a drain of the third nMOSFET, a gate of the third nMOSFET is connected to the bias voltage, a source of the third nMOSFET is connected to a collector of the sixth NPN transistor, a base of the sixth NPN transistor is connected to a common terminal between the first resistor and the second resistor, and an emitter of the sixth NPN transistor is connected to the emitter of the fifth NPN transistor.

8. The reference voltage circuit according to claim 7, wherein the feedforward amplification unit includes a first pMOSFET, a second pMOSFET, a fourth nMOSFET, a fifth nMOSFET, and a second tail current source; and a source of the first pMOSFET is connected to the power supply voltage, a gate of the first pMOSFET is connected to a gate of the second pMOSFET, a gate of the first pMOSFET is connected to a drain of the first pMOSFET, the drain of the first pMOSFET is connected to a drain of the fourth nMOSFET, a gate of the fourth nMOSFET is connected to the drain of the second nMOSFET, a source of the fourth nMOSFET is grounded after connecting to the second tail current source in series, a source of the second pMOSFET is connected to the power supply voltage, a drain of the second pMOSFET is connected to a base of the first PNP transistor, the drain of the second pMOSFET is connected to a drain of the fifth nMOSFET, a gate of the fifth nMOSFET is connected to the drain of the third nMOSFET, and a source of the fifth nMOSFET is connected to the source of the fourth nMOSFET.

9. The reference voltage circuit according to claim 8, wherein the feedforward amplification unit further includes a second capacitor; and a first end of the second capacitor is connected to the gate of the fourth nMOSFET, and a second end of the second capacitor is connected to the drain of the fifth nMOSFET.

10. A method for designing a reference voltage circuit, comprising:

on a basis of forming feedback to a reference core unit through a main amplification unit:

using a feedforward amplification unit to form a feedforward to the main amplification unit;

using the reference core unit, the main amplification unit, and the feedforward amplification unit to form a third-order negative feedback loop; and using the third-order negative feedback loop to improve a power supply rejection ratio of a reference voltage output by the reference core unit.

* * * * *